US009380125B2

(12) United States Patent
Soliman et al.

(10) Patent No.: US 9,380,125 B2
(45) Date of Patent: Jun. 28, 2016

(54) APPARATUS AND METHOD FOR DELIVERY CONTROL OF APPLICATION DATA TO A MOBILE DEVICE IN A COMMUNICATION NETWORK

(75) Inventors: Samir Salib Soliman, Poway, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 13/550,158

(22) Filed: Sep. 11, 2012

(65) Prior Publication Data

US 2014/0074907 A1 Mar. 13, 2014

(51) Int. Cl.
G06F 15/16 (2006.01)
H04L 29/08 (2006.01)
H04W 28/14 (2009.01)
H04W 4/18 (2009.01)

(52) U.S. Cl.
CPC ............. *H04L 67/2819* (2013.01); *H04W 4/18* (2013.01); *H04W 28/14* (2013.01)

(58) Field of Classification Search
CPC .............. H04L 29/06; H04L 29/08072; H04L 29/0809
USPC .......................................... 709/203, 201, 202
See application file for complete search history.

(56) References Cited

U.S. PATENT DOCUMENTS

| 8,520,694 B1* | 8/2013 | Bali .............................. 370/428 |
| 2003/0123422 A1* | 7/2003 | Miya ............................. 370/338 |
| 2004/0125800 A1 | 7/2004 | Zellner |
| 2005/0027791 A1* | 2/2005 | Bos et al. ...................... 709/200 |
| 2008/0096505 A1 | 4/2008 | Martinez et al. |
| 2009/0082699 A1 | 3/2009 | Bang et al. |
| 2010/0322124 A1 | 12/2010 | Luoma et al. |
| 2011/0047285 A1* | 2/2011 | Kampmann et al. .......... 709/231 |
| 2011/0131321 A1 | 6/2011 | Black et al. |
| 2012/0023226 A1 | 1/2012 | Petersen et al. |
| 2012/0023236 A1* | 1/2012 | Backholm et al. ............ 709/226 |
| 2012/0210415 A1* | 8/2012 | Somani ............... H04L 63/0884 726/9 |
| 2012/0303774 A1* | 11/2012 | Wilson .................... H04L 67/26 709/223 |
| 2013/0086202 A1* | 4/2013 | Connelly ............ G06F 9/45558 709/217 |
| 2014/0075472 A1* | 3/2014 | Mitsuya .................. G06F 21/10 725/32 |

FOREIGN PATENT DOCUMENTS

WO WO-2011067675 A2 6/2011

OTHER PUBLICATIONS

International Search Report and Written Opinion—PCT/US2013/058948—ISA/EPO—Mar. 3, 2014.

\* cited by examiner

*Primary Examiner* — Abdelnabi Musa
(74) *Attorney, Agent, or Firm* — Charles E. Eggers

(57) ABSTRACT

Apparatus and methods are provided for buffering application data from one or more application servers to be transmitted to a mobile device at a suitable opportunity. The application data may be buffered at the application servers, or at a delivery control server. An opportunity to transmit the application data may arise in accordance with detected user activity at the mobile device, or predicted imminent user activity at the mobile device, indicating that the user may wish to receive the application data.

34 Claims, 10 Drawing Sheets

APPARATUS AND METHOD FOR DELIVERY CONTROL OF APPLICATION DATA TO A MOBILE DEVICE IN A COMMUNICATION NETWORK

BACKGROUND

1. Technical Field

Aspects of the present disclosure relate generally to wireless communication systems, and more particularly, to the transmission of application data corresponding to applications like email, social networking, or application updates, from a network such as the Internet to a wireless mobile device.

2. Background

Wireless communication networks are widely deployed to provide various communication services such as telephony, video, data, messaging, broadcasts, and so on. Such networks, which are usually multiple access networks, support communications for multiple users by sharing the available network resources.

In a typical wireless device such as a mobile phone, tablet, PDA, etc., many application programs can be used, each of which may perform a relatively large number of small transactions. Many of these applications are designed such that user data is transmitted utilizing a "push" paradigm from the network to the mobile device, even while the mobile device is in a stand-by mode or not otherwise being utilized by the user. For example, instant messaging applications, social networking applications, and various subscription based services such as mailing lists, stocks, news, and even application updates can each independently initiate their own transactions and push data to the wireless device.

When combined with the network overhead associated with each such transaction, the amount of time and resources consumed by these applications can be as much as that of large transactions. Moreover, as the number of such applications continues to increase, it is expected that very soon, such mobile devices will be inundated with large numbers of these small transactions, adversely impacting battery life and network resources.

As the demand for mobile broadband access continues to increase, research and development continue to advance such wireless technologies not only to meet the growing demand for mobile broadband access, but to advance and enhance the user experience with mobile communications. For example, ongoing effort continues seek to improve the efficiency of the utilization of network resources and/or to improve the battery life of mobile devices.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure enable multiple small transactions corresponding to a plurality of applications to be combined into single transactions, to be transmitted to the mobile device in a timely fashion, e.g., when an opportunity arises that such a transmission may efficiently be received at the mobile device. Determination of such opportunity may be activity-based, that is, according to user activity at the mobile device.

In one aspect, the disclosure provides a method of buffering application data operable at a delivery control server. Here, the method includes receiving, from one or more application servers, an application data transmission for a mobile device, storing the application data in a buffer, receiving an activity notification from the mobile device indicating an opportunity to transmit the buffered data to the mobile device, and transmitting the buffered application data to the mobile device in response to the activity notification.

Another aspect of the disclosure provides a method of buffering application data operable at a mobile device, including detecting user activity at the mobile device, transmitting an activity notification to a delivery control server upon detecting the user activity at the mobile device, and receiving buffered application data from the deliver control server in response to the activity notification.

Another aspect of the disclosure provides a method of moderating buffered application data operable at an opportunity notification server. Here, the method includes receiving an activity notification from a mobile device indicating an opportunity to transmit the buffered application data to the mobile device, and transmitting an opportunity notification to one or more application servers, responsive to the activity notification, to indicate an opportunity for the application server to transmit the buffered application data to the mobile device.

Another aspect of the disclosure provides a method of moderating buffered application data operable at a mobile device. Here, the method includes detecting user activity at the mobile device, transmitting an opportunity notification to one or more application servers, responsive to the detected activity, to indicate an opportunity for the application server to transmit the buffered application data to the mobile device, and receiving the transmitted application data from the application server.

Another aspect of the disclosure provides a delivery control server for buffering application data, including means for receiving, from one or more application servers, an application data transmission for a mobile device, means for buffering the application data, means for receiving an activity notification from the mobile device indicating an opportunity to transmit the buffered data to the mobile device, and means for transmitting the buffered application data to the mobile device in response to the activity notification.

Another aspect of the disclosure provides a mobile device including means for detecting user activity, means for transmitting an activity notification to a delivery control server upon detecting the user activity, and means for receiving buffered application data from the deliver control server in response to the activity notification.

Another aspect of the disclosure provides an opportunity notification server for moderating buffered application data, including means for receiving an activity notification from a mobile device indicating an opportunity to transmit the buffered application data to the mobile device, and means for transmitting an opportunity notification to one or more application servers, responsive to the activity notification, to indicate an opportunity for the application server to transmit the buffered application data to the mobile device.

Another aspect of the disclosure provides a mobile device for moderating buffered application data, including means for detecting user activity, means for transmitting an opportunity notification to one or more application servers, responsive to the detected activity, to indicate an opportunity for the application server to transmit the buffered application data to the mobile device, and means for receiving the transmitted application data from the application server.

Another aspect of the disclosure provides a delivery control server for buffering application data, including at least one processor, a memory coupled to the at least one processor, and a communication interface coupled to the at least one processor. Here, the at least one processor is configured to receive, from one or more application servers, an application data transmission for a mobile device, to store the application data in the memory, to receive an activity notification from the mobile device indicating an opportunity to transmit the stored data to the mobile device, and to transmit the stored application data to the mobile device in response to the activity notification.

Another aspect of the disclosure provides a mobile device, including at least one processor, a memory coupled to the at least one processor, and a communication interface coupled to the at least one processor. Here, the at least one processor is configured to detect user activity, to transmit an activity notification to a delivery control server upon detecting the user activity, and to receive buffered application data from the deliver control server in response to the activity notification.

Another aspect of the disclosure provides an opportunity notification server for moderating buffered application data, including at least one processor, a memory coupled to the at least one processor, and a communication interface coupled to the at least one processor. Here, the at least one processor is configured to receive an activity notification from a mobile device indicating an opportunity to transmit the buffered application data to the mobile device, and to transmit an opportunity notification to one or more application servers, responsive to the activity notification, to indicate an opportunity for the application server to transmit the buffered application data to the mobile device.

Another aspect of the disclosure provides a mobile device for moderating buffered application data, including at least one processor, a memory coupled to the at least one processor, and a communication interface coupled to the at least one processor. Here, the at least one processor is configured to detect user activity, to transmit an opportunity notification to one or more application servers, responsive to the detected activity, to indicate an opportunity for the application server to transmit the buffered application data to the mobile device, and to receive the transmitted application data from the application server.

Another aspect of the disclosure provides a computer program product including a computer-readable storage medium operable at a delivery control server, having instructions for causing a computer to receive, from one or more application servers, an application data transmission for a mobile device, instructions for causing a computer to store the application data in a buffer, instructions for causing a computer to receive an activity notification from the mobile device indicating an opportunity to transmit the buffered data to the mobile device, and instructions for causing a computer to transmit the buffered application data to the mobile device in response to the activity notification.

Another aspect of the disclosure provides a computer program product including a computer-readable storage medium operable at a mobile device, having instructions for causing a computer to detect user activity at the mobile device, instructions for causing a computer to transmit an activity notification to a delivery control server upon detecting the user activity at the mobile device, and instructions for causing a computer to receive buffered application data from the deliver control server in response to the activity notification.

Another aspect of the disclosure provides a computer program product including a computer-readable storage medium operable at an opportunity notification server, having instructions for causing a computer to receive an activity notification from a mobile device indicating an opportunity to transmit buffered application data to the mobile device, and instructions for causing a computer to transmit an opportunity notification to one or more application servers, responsive to the activity notification, to indicate an opportunity for the application server to transmit the buffered application data to the mobile device.

Another aspect of the disclosure provides a computer program product including a computer-readable storage medium operable at a mobile device, having instructions for causing a computer to detect user activity at the mobile device, instructions for causing a computer to transmit an opportunity notification to one or more application servers, responsive to the detected activity, to indicate an opportunity for the application server to transmit the buffered application data to the mobile device, and instructions for causing a computer to receive the transmitted application data from the application server.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
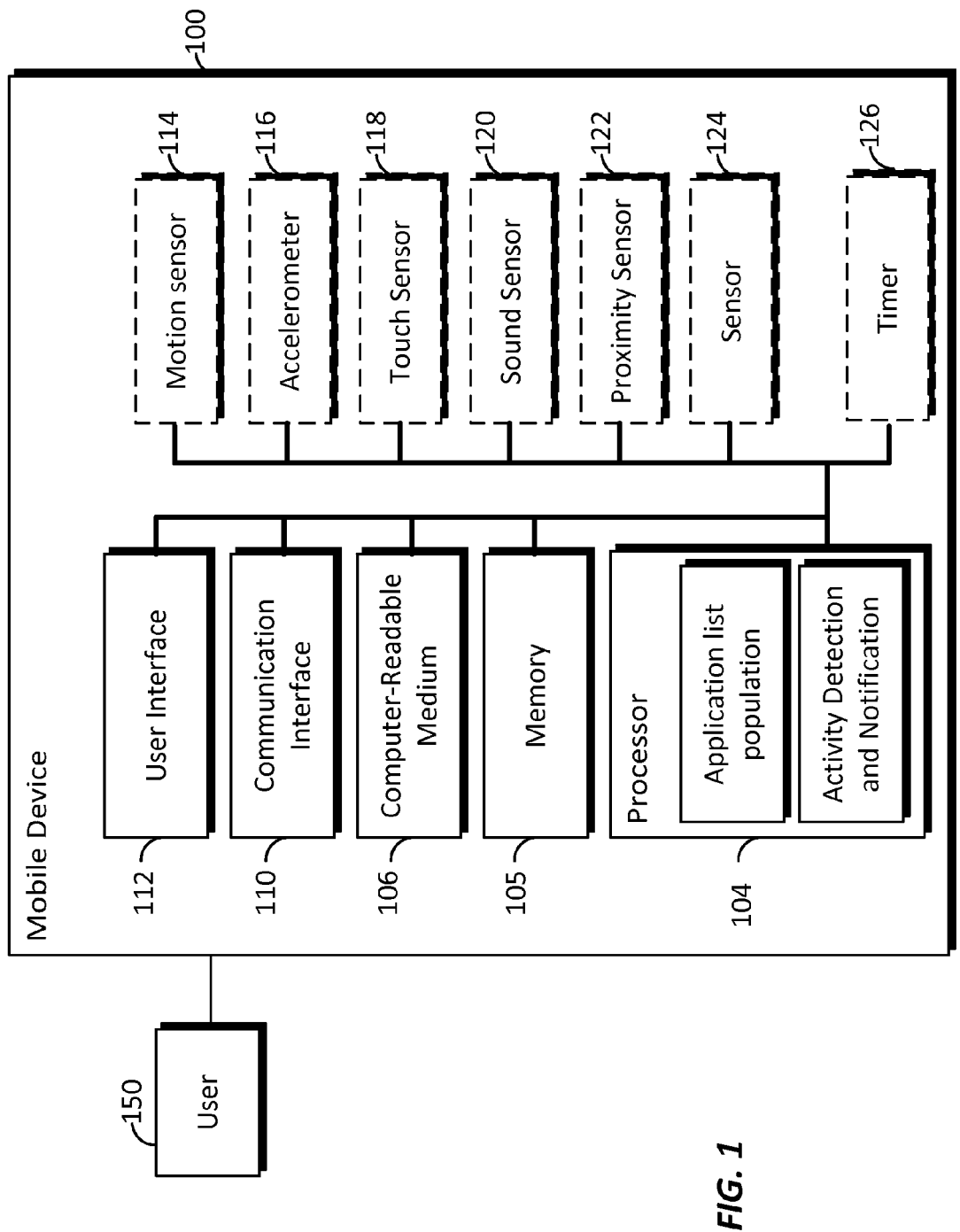
FIG. 1 is a simplified block diagram illustrating a mobile device according to one example.

FIG. 1 is a conceptual diagram illustrating an example of a hardware implementation for a mobile device 100. In accordance with various aspects of the disclosure, an element, or any portion of an element, or any combination of elements may be implemented with a mobile device 100 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the mobile device 100 may include various circuits such as one or more processors (represented generally by the processor 104), a memory 105, and computer-readable media (represented generally by the computer-readable storage medium 106). The processor 104 may include or be coupled to various other circuits such as timing sources, peripherals, voltage regulators, and power management circuits, which are well known in the art, and therefore, will not be described any further. The processor 104 may additionally be coupled to a communication interface 110. The communication interface 110 may include one or more transmitters and/or receivers to provide a means for communicating with various other apparatus over a transmission medium. Depending upon the nature of the mobile device 100, a user interface 112 (e.g., keypad, display, speaker, microphone, joystick) may also be provided.

The processor 104 is responsible for managing general processing, including the execution of software stored on the computer-readable storage medium 106. The software, when executed by the processor 104, causes the mobile device 100 to perform the various functions described below. The computer-readable storage medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 106. The computer-readable storage medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable storage medium 106 may reside in the processing system 114, external to the processing system 114, or distributed across multiple entities including the processing system 114. The computer-readable storage medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The mobile device 100 may be utilized in any of a broad variety of telecommunication systems, network architectures, and communication standards. In an aspect of the disclosure, the mobile device 100 may be utilized in a wireless communication network providing access to a network such as the Internet. In this way, many modern mobile devices such as the mobile device 100 are capable of utilizing various applications such as instant messaging, social networking, and various subscription-based services (e.g., mailing lists, stocks, news, application updates, etc.).

Many of these applications typically utilize a "push" model, or a sender-driven model wherein an application server, which transmits application data to the mobile device 100, controls that transmission. As the number of independently operating application servers communicating with a mobile device increases, transmissions to the mobile device may become more and more frequent, utilizing greater radio resources as well as increasing battery consumption at the mobile device.

While coordinated scheduling of delivery from the application servers, or time-based delivery may reduce these disadvantages to some degree, the mobile device may still not receive the application data at the time when such application data is desired by the user of the mobile device 100. Furthermore, even periodic scheduling of the delivery of data may nevertheless consume more battery power than might be necessary.

Therefore, according to various aspects of the present disclosure, control of the delivery of data from the application servers to the mobile device 100 may be activity-based, e.g., under the control of the mobile device 100 and based on certain activity at the mobile device 100, as described in further detail below.

For example, the receiver of such application data (e.g., the mobile device 100) may be configured to control if and when the application data is received from the respective servers. Here, the push model for transmitting application data to the receiver under application server control may be replaced with a pull model, such that application data is transmitted to the receiver under the control of the receiver (e.g., the mobile device 100). In this way, in some aspects of the disclosure, data may be transmitted to the mobile device 100 when a suitable opportunity arises. In this way, rather than each of many application servers pushing their information to the wireless device at their own discretion, the mobile device may pull the data from each of multiple applications in the network at a convenient time for the mobile device.

As described in further detail below, some aspects of the present disclosure utilize a delivery control server (DCS) to buffer application data until such a time as a suitable opportunity arises for the buffered application data to be transmitted to the mobile device. Further, some aspects of the present disclosure utilize an opportunity notification server (ONS) to moderate buffering of application data at application servers until such a time as a similar opportunity arises for the buffered application data to be transmitted to the mobile device. Here, the ONS may be located within the mobile device;

while in other examples, the ONS may be a separate device, e.g., a network entity in communication with the mobile device.

Delivery Control Server (DCS)

Figure 2:
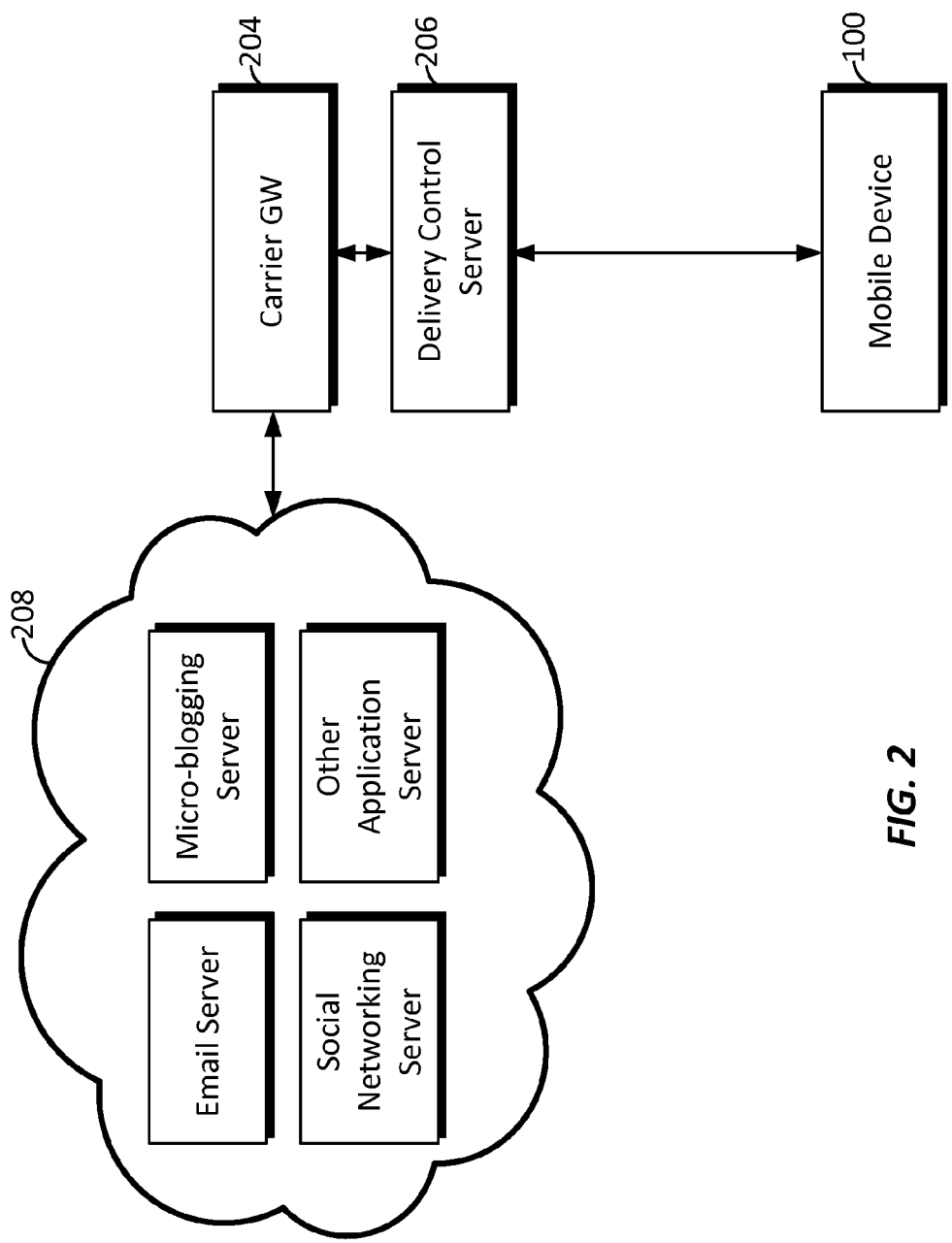
FIG. 2 is a block diagram conceptually illustrating a network architecture including a delivery control server according to one example.

Referring now to FIG. 2, as an illustrative example without limitation, various aspects of the present disclosure are illustrated with respect to a cellular network including the mobile device 100, a carrier gateway 204, a delivery control server (DCS) 206, and a network cloud 208 representing the Internet. The carrier gateway 204 may be any suitable network node for coupling the wireless device 100 to the network 208, e.g., by way of one or more of a wireless base station, a base station controller, a radio network controller, and/or other suitable node.

The delivery control server (DCS) 206 is a node (e.g., a server) communicatively coupled to a wireless communication network, configured to buffer application data transmitted from one or more application servers and directed to a mobile device 100. In some examples, the DCS may be a network entity owned and operated by the service provider or operator.

Figure 3:
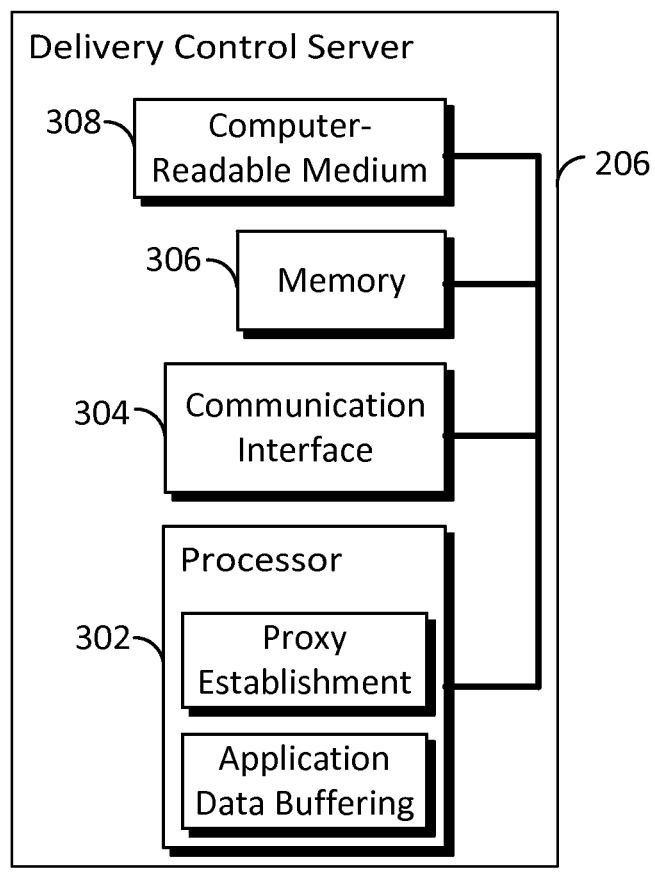
FIG. 3 is a simplified block diagram illustrating a delivery control server according to one example.

FIG. 3 is a simplified block diagram illustrating one example of a DCS 206 according to some aspects of the present disclosure. The illustrated DCS includes at least one processor 302, a communication interface 304 coupled to the at least one processor 302, a memory 306 coupled to the at least one processor 302, and a computer-readable storage medium 308 coupled to the at least one processor 302. The processor 302, the memory 306, and the computer-readable storage medium 308 may be generally the same as the corresponding components described above with respect to the mobile device 100, and are therefore not described in additional detail herein. The communication interface 304 may be any suitable wired or wireless interface configured for communication directly or indirectly with the mobile device 100 and one or more application servers in a network 208, as described in further detail below.

Returning to FIG. 2, the network cloud 208 may include one or more application servers for providing application data corresponding to applications being run at the mobile device 100. For example, the mobile device 100 may have installed one or more applications such as a social networking application, an email application, a micro-blogging application, a stock update application, etc. Each of these applications may generally be configured to communicate through the network with one or more application servers in the network 208, e.g., by transmitting user information and credentials, and receiving content information from the respective application servers. Moreover, as used in the present disclosure, the term application data may additionally or alternatively refer to other information received at the mobile device 100 from various servers in the network 208, including but not limited to application updates, system updates, or any other information transmitted from a server in the network 208 to the mobile device 100.

Figure 4:
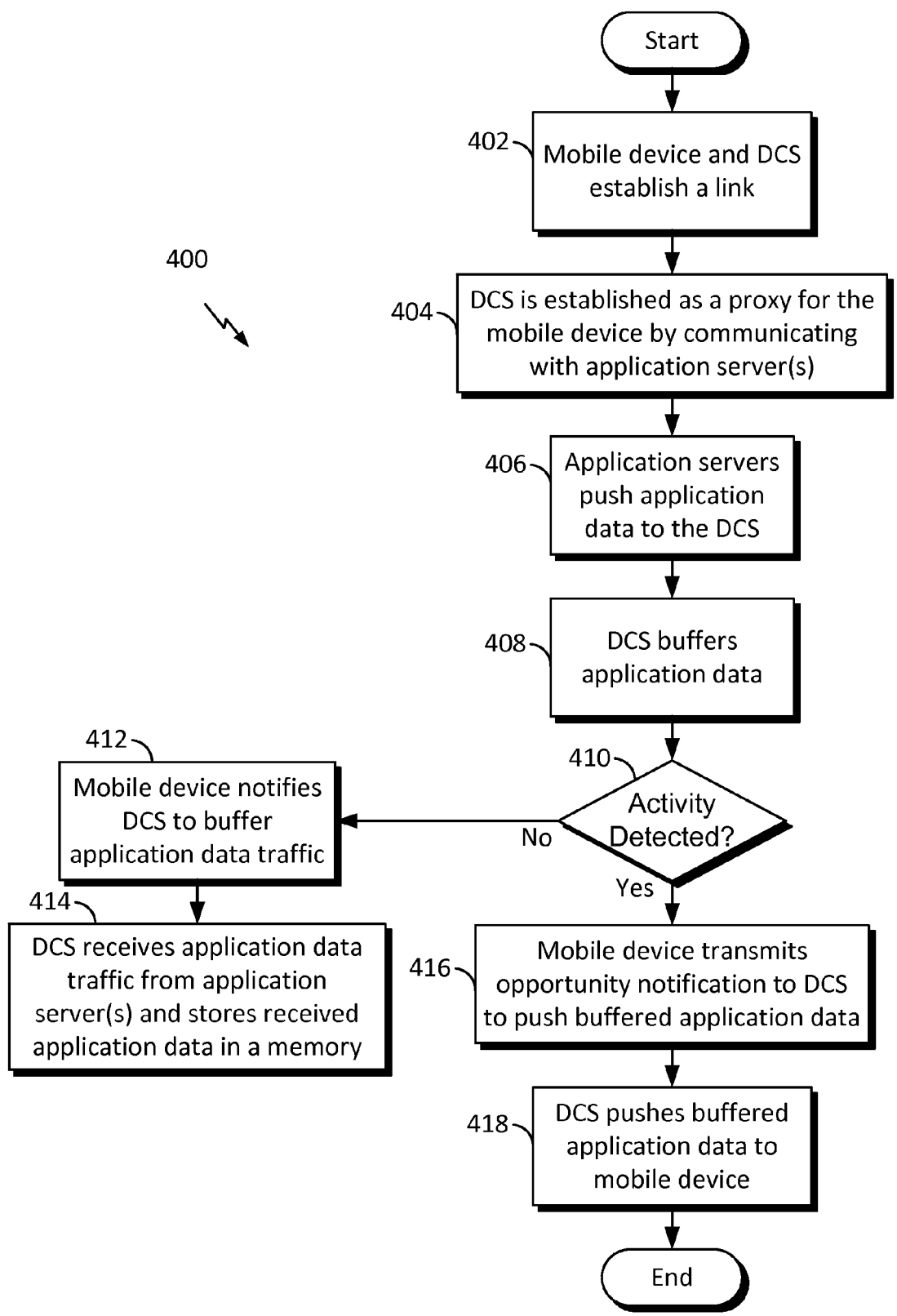
FIG. 4 is a flow chart illustrating a process of buffering application data with the use of the delivery control server according to one example.

FIG. 4 is a flow chart illustrating an exemplary process of application data buffering utilizing the DCS in accordance with some aspects of the present disclosure. As illustrated, the respective steps of the process may be implemented at the mobile device 100 as illustrated in FIG. 1, and at the DCS 206 as illustrated in FIG. 3. Of course, as discussed above, aspects of the present disclosure are not limited to this structure, and any suitable apparatus or means for implementing the described functions may be utilized within the scope of the present disclosure.

At step 402, the mobile device 100 and the DCS 206 may establish a communication link. For example, a suitable negotiation process between the mobile device 100 and the DCS 206 may take place, under the control of the mobile device 100, the DCS 206, or another node in communication with one or both of the mobile device 100 or the DCS 206. At step 404, the DCS 206 may be established as a proxy for the mobile device 100. In one example, mobile device 100 may provide the DCS 206 with information corresponding to one or more applications utilized by the mobile device 100, such as application name, application server address, user ID, password, etc. Further, the wireless device 100 or the DCS 206 may notify the various application servers of the utilization of the DCS and may provide routing information to direct communications from the application servers to the DCS, so that the DCS can act something like a proxy for the wireless device. This way, when the various application servers in the network 208 have information to transmit to the wireless device, they may instead transmit the information to the DCS, where it may be stored, as described in further detail below.

That is, according to some aspects of the disclosure, at step 406 an application server may push application data to the DCS 206; and at step 408, the DCS 206 may buffer the received application data, e.g., by storing the application data in a memory 306. Here, at step 406 the application servers may behave in the same way as they would in a conventional system, with the difference being that they transmit the information to an address corresponding to the DCS 206 rather than transmitting the information to the mobile device 100. Once the application data is buffered at the DCS 206, it may remain until such a time as a suitable opportunity to transmit the buffered application data to the mobile device 100 may arise.

In particular, some server-initiated mobile terminated traffic such as periodic application updates, non-urgent emails, or others, need not be immediately sent to the mobile device 100. In these or other examples, the use of the DCS 206 to buffer such application data until the suitable opportunity arises may provide various benefits to one or both of the mobile device 100 (e.g., improved battery life) or the network (e.g., reduced resource utilization).

At step 410, the mobile device 100 may determine whether activity is detected or predicted. That is, in accordance with certain activity at the mobile device 100, various suitable opportunities for transmission of the buffered application data to the mobile device 100 may be utilized by the mobile device 100 and/or by the DCS 206 to trigger the application data to be transmitted to the mobile device 100. In some examples, a trigger may result from any one or any combination of the following events.

When the mobile device 100 becomes active, and a radio connection between the mobile device 100 and the network 208 is established, this may indicate that the user 150 is utilizing the mobile device 100 and therefore, the user 150 would benefit from reception of the application data. Similarly, when the mobile device 100 transitions from a standby state or from an idle state to an active state, this may indicate that the user 150 is utilizing the mobile device 100 and would benefit from reception of the application data. Detection of these state transitions is straightforward for a mobile device 100, and information indicating this transition may be suitably processed to indicate the trigger.

In some aspects of the disclosure, a sensor at the mobile device 100 may be utilized to detect a trigger event, indicating an opportunity for the buffered application data to be transmitted to the mobile device 100. That is, returning to FIG. 1, the mobile device 100 may include one or more of a motion sensor 114, an accelerometer 116, a touch sensor 118, a sound sensor 120, a proximity sensor 122, or other suitable sensor 124 configured to indicate that the mobile device 100 is being used, or is about to be used by its user 150. Furthermore, the mobile device 100 may include a timer 126 for indicating a time to transmit a trigger if desired. For example, any one or any combination of these triggers may tend to indicate that the user 150 is about to utilize the mobile device 100. That is, as the user 150 approaches the mobile device 100, a proximity sensor 122 may detect that the user 150 intends to use the mobile device 100. Later, as the user 150 actually contacts the mobile device 100, e.g., by picking it up, a touch sensor 118, a motion sensor 114, and/or an accelerometer 116 may detect that the user 150 is about to utilize the mobile device 100. In another example, as the user 150 powers the device, refreshes the screen, answers a call, makes a call, or utilizes a data application, such use may tend to indicate a suitable opportunity to trigger the application data to be transmitted to the mobile device 100. That is, in any of these scenarios, the likelihood that the user 150 would be available to receive, or would desire to receive application data becomes high.

In another aspect of the disclosure, any scheduled activities defined at the mobile device 100 may be utilized to predict an upcoming user activity. For example, any form of reminders by a calendar, a healthcare application, or an alarm application could be used to predict the user's use of the mobile device 100. In this way, the mobile device 100 may determine that the user 150 is about to use the mobile device 100, e.g., just before such reminders.

Returning once again to FIG. 4, if activity is not detected or predicted at step 410, then the process may proceed to step 412, wherein the mobile device 100 may optionally transmit a notification requesting the DCS 206 to buffer the application data traffic, e.g., by storing the received application data in memory. Here, the request to buffer the application data traffic may request a selective buffering, wherein the DCS 206 may be requested to buffer a portion of the application data traffic and to pass other application data traffic directly to the mobile device 100. For example, the DCS 206 may be requested to buffer delay-tolerant data and to immediately pass other less delay-tolerant data such as important emails or the like. At step 414, the DCS 206 may receive the application data traffic from the application server(s) and may accordingly store the received application data in the memory 306.

Returning to step 410, if activity is detected or predicted at the mobile device 100, the process may proceed to step 416, wherein the mobile device 100 may transmit an opportunity notification to the DCS 206, indicating an opportunity for the DCS 206 to push or transmit the buffered application data to the mobile device 100.

At step 418, upon receiving the opportunity notification, the DCS 206 may then push or transmit the buffered data to the mobile device 100.

By utilizing the DCS model described above, the receiver of application data may control if and when such application data is received, and may accordingly set the time for the reception to improve user experience and reduce battery consumption at the mobile device 100, along with other potential benefits. Moreover, the DCS 206 may be informed about relevant events/opportunities by the mobile device 100 (or devices, in a scenario where the DCS 206 is acting as a proxy for more than one mobile device) and may adapt its behavior accordingly.

Moreover, the application servers transmitting the application data to the mobile device need not commit any additional resources for storage of the application data, as it is stored at the DCS 206.

In some aspects of the disclosure, the DCS 206 may be configured to store suitable rules for storage and delivery of the application data. For example, the configuration of which activity at the mobile device 100 may trigger the download of the stored application data, the timing, or any other suitable configuration information relating to the delivery of the application data from the DCS 206 to the mobile device 100.

In a further aspect of the disclosure, the DCS 206 may be capable of collecting useful statistics about the user 150 and/or the mobile device 100. For example, information from one or more sensors at the device, usage statistics corresponding to state changes, etc., such as the information that may be communicated to the DCS 206 in the opportunity notification message may be collected at the DCS 206 and transmitted to one or more network nodes as needed.

Utilization of the DCS 206 as described herein need not necessarily require any change to the application servers at the network 206 transmitting the application data. That is, when the application servers are given an address of the DCS 206, to act as the proxy for the mobile device 100, the application server may behave without modification, transmitting the application data to the DCS 206 as needed.

Opportunity Notification Server (ONS)

According to another aspect of the disclosure, an opportunity notification server (ONS) may be utilized to notify one or more application servers upon the occurrence of a transmission opportunity or trigger, as described above. That is, rather than utilizing the DCS 206 as described above to buffer the application data from the application servers, the application servers themselves may be configured each to buffer their respective application data until the opportunity notification is transmitted from the ONS. Once the opportunity notification is received at an application server, the application server may then transmit buffered, mobile-terminated application data to the mobile device.

Figure 5:
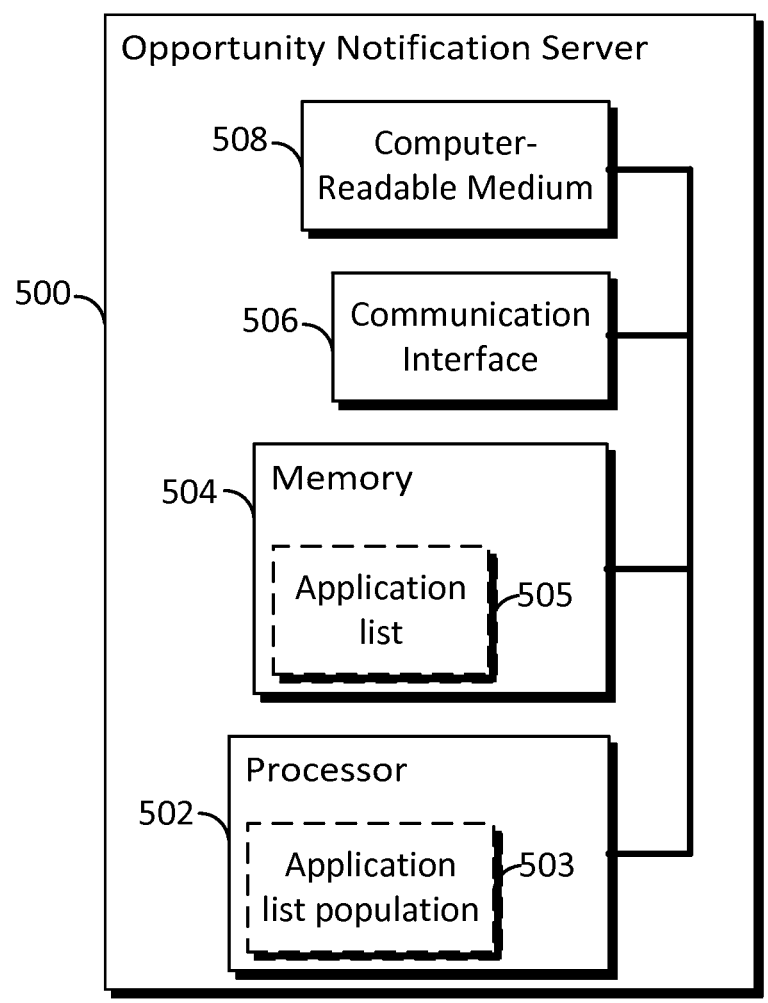
FIG. 5 is a simplified block diagram illustrating an opportunity notification server according to one example.

FIG. 5 is a simplified block diagram illustrating an ONS 500 in accordance with some aspects of the present disclosure. The illustrated ONS 500 includes at least one processor 502, a memory 504 coupled to the at least one processor 502, a communication interface 506 coupled to the at least one processor 502, and a computer-readable storage medium 508 coupled to the processor 502. The processor 502, the memory 504, and the computer-readable storage medium 508 may be generally the same as the corresponding components described above with respect to the mobile device 100, and are therefore not described in additional detail herein. The communication interface 506 may be any suitable wired or wireless interface configured for communication directly or indirectly with the mobile device 100 and one or more application servers in a network 208, as described in further detail below.

Figure 6:
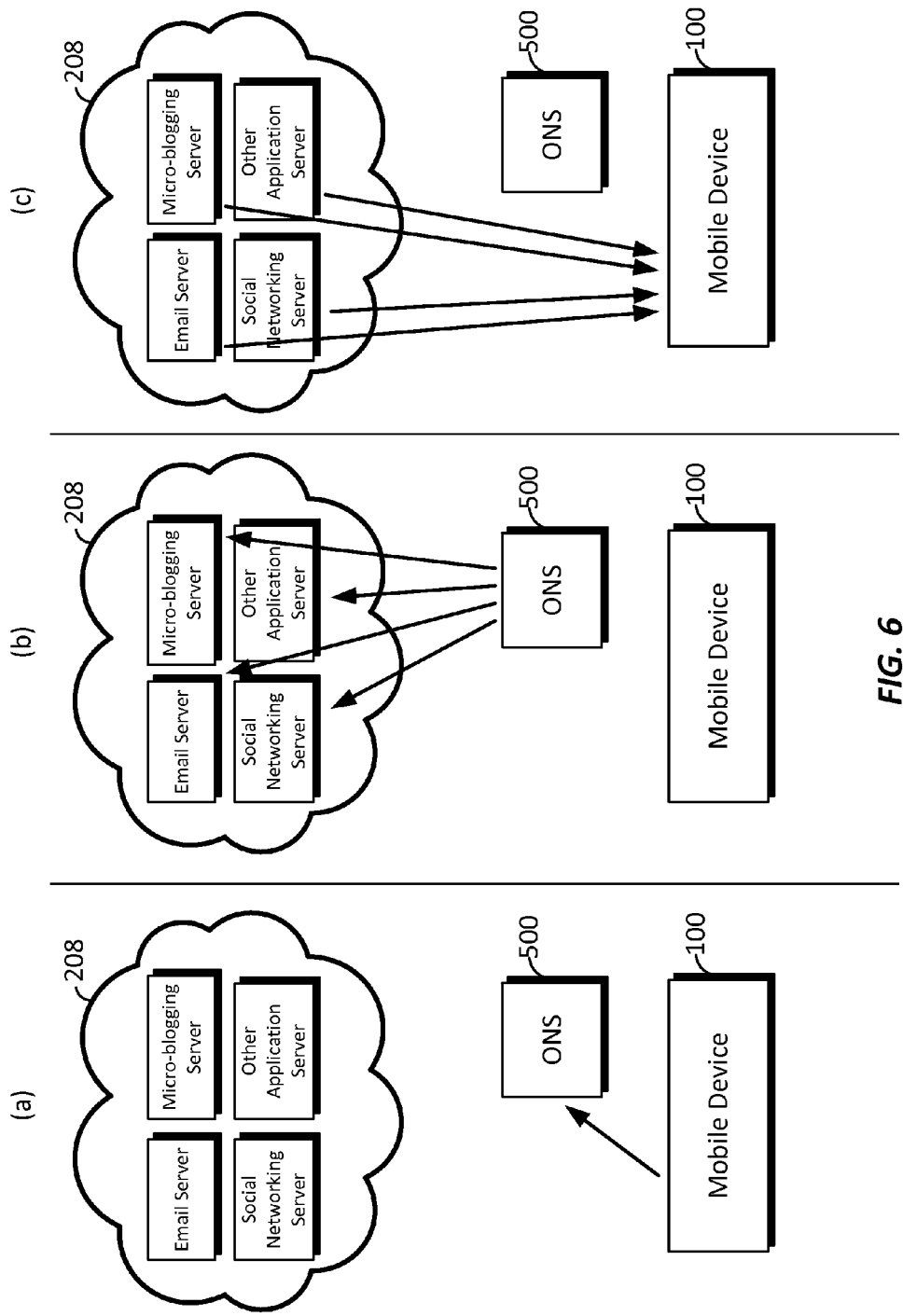
FIG. 6 is a block diagram conceptually illustrating a network architecture including an opportunity notification server according to one example.

FIG. 6 is a simplified schematic diagram of a network topology utilizing a network-based ONS in accordance with some aspects of the disclosure. In the illustration, the mobile device 100 may communicate with an opportunity notification server (ONS) 500 as well as with one or more application servers in a network 208. Moreover, the ONS 500 is configured to communicate with the one or more application servers in the network 208.

Figure 7:
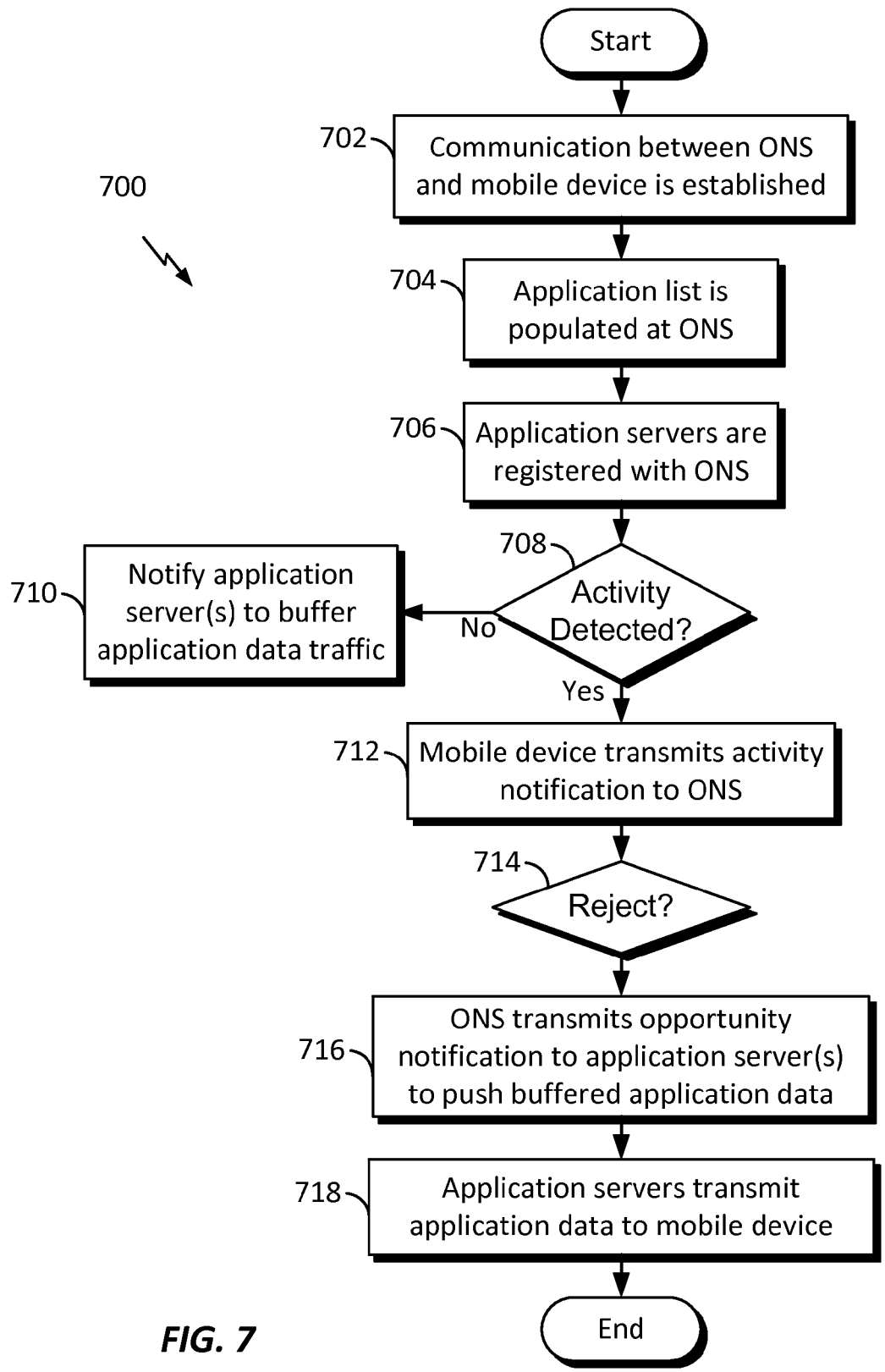
FIG. 7 is a flow chart illustrating a process of buffering application data with the use of the opportunity notification server according to one example.

The illustration of FIG. 6 includes parts (a), (b), and (c) to more clearly illustrate a sequence of operation utilizing the ONS 500. Referring now to FIG. 7, this sequence of operation is illustrated in additional detail in a flow chart illustrating an exemplary process of application data buffering utilizing the ONS 500 in accordance with some aspects of the present disclosure. As illustrated, the respective steps of the process may be implemented by the mobile device 100 as illustrated in FIG. 1, and at the ONS 500 illustrated in FIG. 5. Of course, as discussed above, aspects of the present disclosure are not limited to this structure, and any suitable apparatus or means for implementing the described functions may be utilized within the scope of the present disclosure.

At step 702, a communication link between the ONS 500 and the mobile device 100 may be established. Once communication between the ONS 500 and the mobile device 100 is established, in an aspect of the disclosure, at step 704 the memory 504 at the ONS 500 may be populated with an application list 505. That is, the ONS 500 may be configured to maintain a list of applications utilized by the mobile device 100, including user information associated with respective ones of the listed applications, e.g., user IDs, passwords, etc. In some examples, the mobile device 100 may include operational circuitry 503 or suitable configuration to enable the mobile device 100 to populate the application list 505 at the ONS 500 on behalf of the applications utilized by the mobile device 100. In other examples, each application in the mobile device 100 may individually populate the application list 505 at the ONS 500. Of course, a combination of these two examples may be utilized in a particular example.

At step 706, the application servers corresponding to the application list 505 may be registered with the ONS 500. For example, the ONS 500 or the mobile device 100 may configure the applications to operate in a pull mode, e.g., by disabling push operations for application data at the application servers. Moreover, other suitable configuration information may be transmitted from the mobile device 100 and/or from the ONS 500 to the respective application servers to enable pushing of the application data from those servers upon the reception of a suitable opportunity notification from the ONS 500, as described below.

At step 708, the mobile device 100 may determine whether user activity is detected or predicted. For example, the detection or prediction of activity may be the same as the activity detection or prediction at step 410 described above, utilizing one or more sensors, a timer, application activity, or a state change at the mobile device 100. If no such activity is detected or predicted, the process may proceed to step 710, wherein the mobile device 100 may notify the application server to buffer application data traffic. That is, in an aspect of the present disclosure, the application servers at the network 208 may be configured to buffer the application data until such a time as an opportunity notification is received from the ONS 500. Here, the request to buffer the application data traffic may request a selective buffering, wherein an application server may be requested to buffer a portion of the application data traffic and to pass other application data traffic directly to the mobile device 100. For example, the application server may be requested to buffer delay-tolerant data and to immediately pass other less delay-tolerant data such as important emails or the like.

If, on the other hand, activity is detected or predicted at the mobile terminal 100 at step 708, the process may proceed to step 712, wherein the mobile device 100 may transmit an activity notification message to the ONS 500. This message corresponds to diagram (a) in FIG. 6. In response to receiving the activity notification, at step 714, in some aspects of the disclosure, the ONS 500 may determine whether to reject the activity notification transmitted from the mobile device to the ONS 500. That is, the ONS 500 may be configured to determine, based on a characteristic of the activity notification received in step 712, whether or not to transmit an opportunity notification to the application servers.

For example, the determination at step 714 may be based on any suitable factors, such as but not limited to the absolute time, the relative time since a prior opportunity notification message was previously transmitted, which one of a plurality of sensors at the mobile device 100 indicated a particular type of user activity, etc. If the ONS 500 determines to reject the activity notification, then the process may return to step 708 and await the next activity and corresponding activity notification.

If, on the other hand, the ONS 500 does not reject the activity notification, the process may proceed to step 716, wherein the ONS 500 may transmit an opportunity notification message to one or more application servers, requesting the respective application servers to push or transmit their buffered application data. This transmission of the opportunity notification at step 716 corresponds to diagram (b) in FIG. 6. At step 718, the application servers, upon receiving the opportunity notification message, may transmit the buffered application data to the mobile device 100. This transmission of the buffered application data to the mobile device 100 corresponds to diagram (c) in FIG. 6.

By utilizing the ONS 500 as described above, a single trigger from the mobile device 100 to the ONS 500 (e.g., as transmitted at step 712) can trigger data transmissions from multiple application servers. In comparison to the case where various applications in the mobile device 100 individually contact the application servers, this scheme can reduce the over-the-air data transmission and the battery consumption in the mobile device 100.

Integrated ONS

Figure 8:
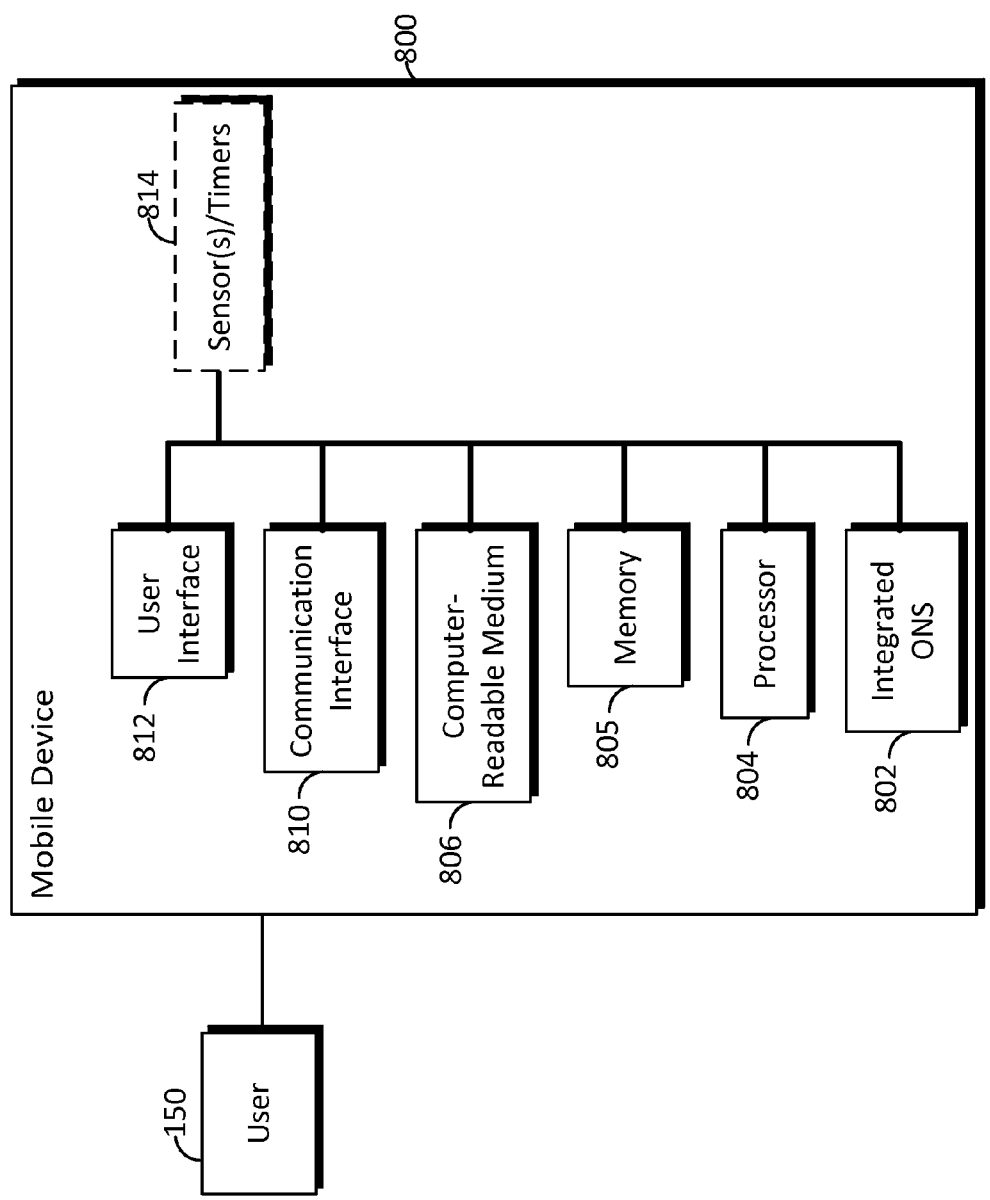
FIG. 8 is a simplified block diagram illustrating a mobile device including an integrated opportunity notification server according to one example.

In another aspect of the disclosure, the ONS may be integrated within the mobile device. For example, referring to FIG. 8, a mobile device 800 may include opportunity notification functionality embedded in the processor 804; as a software module stored in a computer-readable storage medium 806; or an opportunity notification server may include dedicated circuitry in the mobile device 800, such as the integrated ONS 802. Furthermore, the mobile device 800 may include at least one processor 804, a memory 805, a computer-readable storage medium 806, a communication interface 810, and a user interface 812. The processor 804, the memory 805, the computer-readable storage medium 806, the communication interface 810, and the user interface 812 may be generally the same as the corresponding components described above with respect to the mobile device 100, and are therefore not described in additional detail herein.

In this example, the functionality of the integrated ONS 802 may in many ways be the same as the functionality of the ONS 500 described above, with certain simplifications based on the integrated nature of the ONS.

Figure 9:
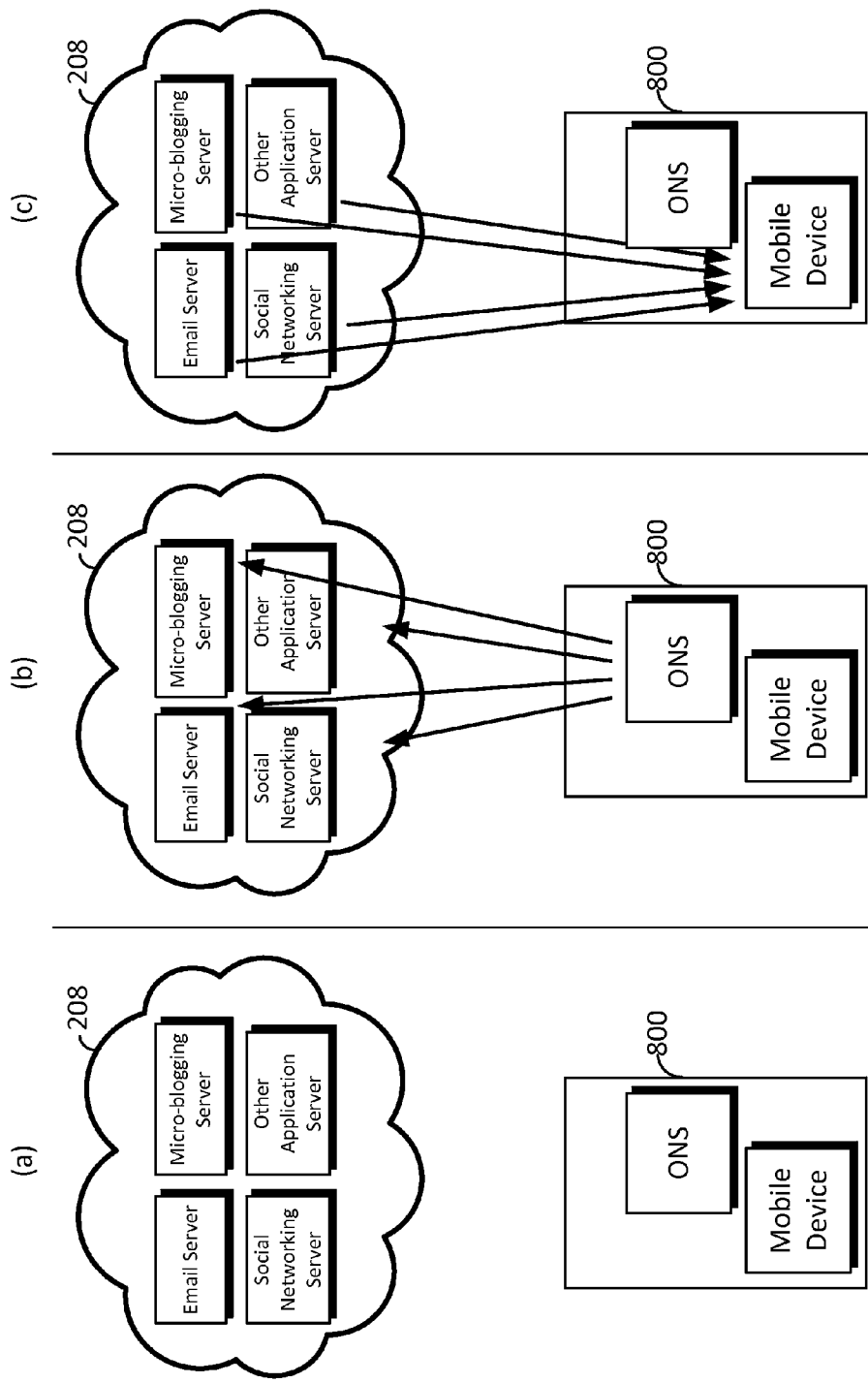
FIG. 9 is a block diagram conceptually illustrating a network architecture including a mobile device with an integrated opportunity notification server according to one example.

For example, FIG. 9 is a simplified schematic diagram of a network topology utilizing an integrated, mobile device-based ONS 802 in accordance with some aspects of the present disclosure. In the illustration, the mobile device 800 including the integrated ONS 802 may be configured to communicate with one or more application servers at a network 208, as described above.

Figure 10:
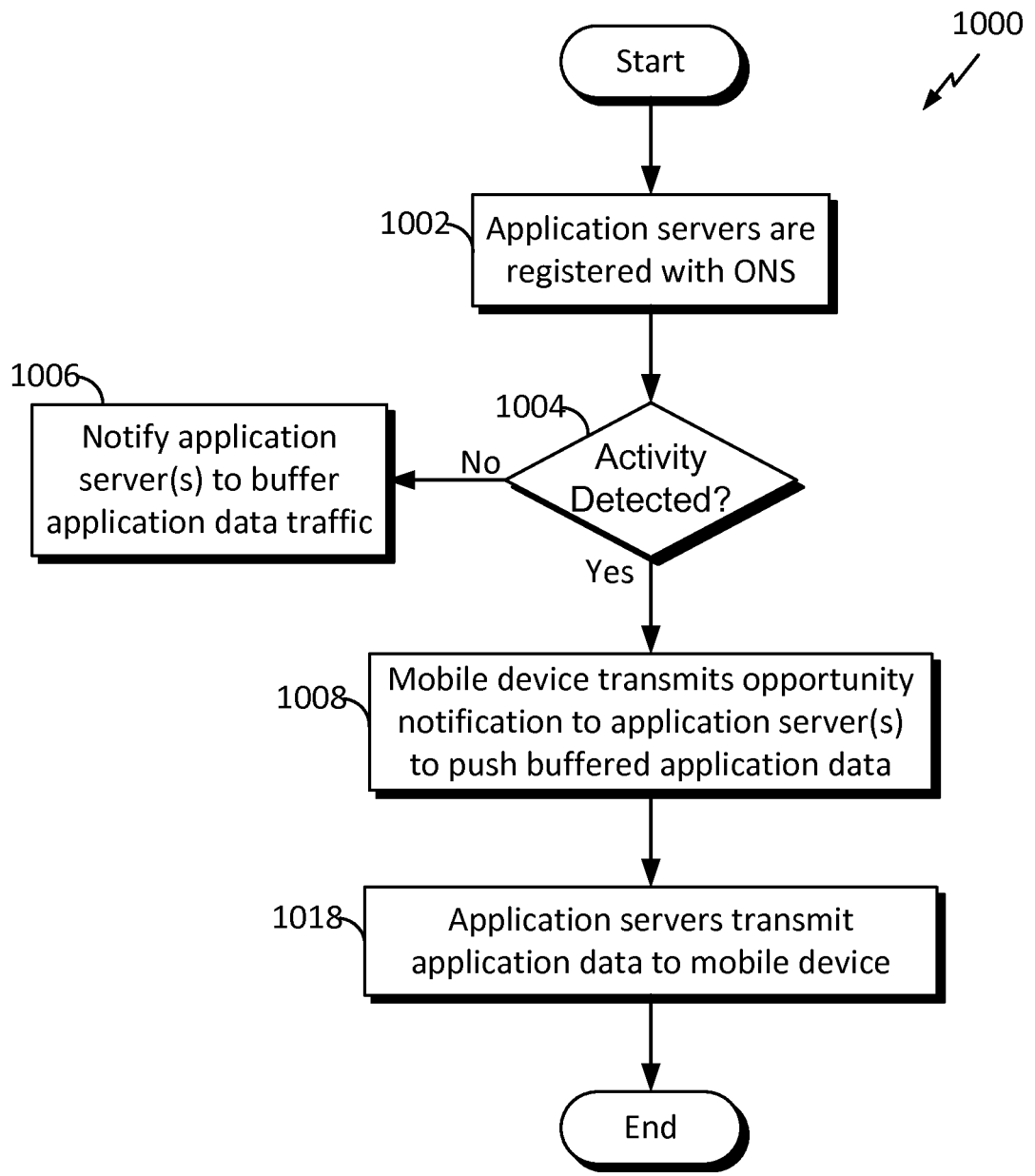
FIG. 10 is a flow chart illustrating a process of buffering application data with the use of a mobile device including an integrated opportunity notification server according to one example.

The illustration of FIG. 9 includes parts (a), (b), and (c) to more clearly illustrate a sequence of operation of the mobile device 800 including the integrated ONS. Referring to FIG. 10, this sequence of operation is illustrated in additional detail in a flow chart illustrating an exemplary process of application data buffering utilizing a mobile device 800 including the integrated ONS 802 in accordance with some aspects of the present disclosure. Of course, as discussed above, aspects of the present disclosure are not limited to this structure, and any suitable apparatus or means for implementing the described functions may be utilized within the scope of the present disclosure.

At step 1002, the application servers at the network 208 are registered with the integrated ONS 802. For example, the mobile device 800 may configure its applications to operate in a pull mode, e.g., by disabling push operations for application data at the application servers. Moreover, other suitable configuration information may be transmitted from the mobile device 800 to the respective application servers to enable pushing of the application data from those servers upon the reception of a suitable opportunity notification from the mobile device 800, as described below.

At step 1004, the mobile device 800 may determine whether user activity is detected or predicted. For example, the detection of activity may be the same as the activity detection at step 410 described above, utilizing one or more sensors, a timer, application activities, or a state change at the mobile device 800. If no such activity is detected, the process may proceed to step 1006, wherein the mobile device 800 may notify the application server to buffer application data traffic. That is, in an aspect of the present disclosure, the application servers at the network 208 may be configured to buffer the application data until such a time as an opportunity notification is received from the mobile device 800. Here, the request to buffer the application data traffic may request a selective buffering, wherein an application server may be requested to buffer a portion of the application data traffic and to pass other application data traffic directly to the mobile device 800. For example, the application server may be requested to buffer delay-tolerant data and to immediately pass other less delay-tolerant data such as important emails or the like.

If, on the other hand, activity is detected at the mobile terminal 800 at step 1004, the process may proceed to step 1008, wherein the mobile device 800 may transmit an opportunity notification message to the application servers at the network 208 to request the respective application servers to push their buffered application data. This step corresponds to illustration (b) in FIG. 9 where the mobile device 800 including the integrated ONS 802 transmits the opportunity notification to the application servers at the network 208. At step 1010, the application servers, upon receiving the opportunity notification message, may transmit the buffered application data to the mobile device 800. This step corresponds to illustration (c) in FIG. 9, where the application servers transmit the buffered application data to the mobile device 800.

In the above-described examples, it has been described that the application data generally may be buffered until such time as an opportunity notification is received, at which time the buffered application data may be transmitted to the mobile device. In some aspects of the disclosure, this model may be followed for a first subset of the application data, while a second subset of the application data may be transmitted directly to the mobile device without delay. For example, the second subset of application data may include delay-sensitive data, such as important emails or the like.

In a further aspect of the disclosure, the mobile device or its user may be enabled to configure which types of application data fall into the first subset and the second subset, such that user-configured sets of application data can be immediately transmitted to the mobile device from the application server, while other application data can be buffered as described above.

As those skilled in the art will readily appreciate, various aspects described throughout this disclosure may be applied in any of various telecommunication systems, network architectures and communication standards. By way of example, various aspects may be utilized within UMTS systems employing an air interface such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of buffering application data operable at a delivery control server, comprising:
   receiving information that identifies applications used by a mobile device at the delivery control server from the mobile device;
   transmitting, by the delivery control server, a notification to one or more application servers associated with the identified applications to push application data to the delivery control server instead of the mobile device;
   receiving a request to buffer application data for the identified applications at the delivery control server, wherein the request is received from the mobile device, the request is adapted to request the delivery control server to buffer a portion of the application data in accordance with a selection criteria, and the selection criteria comprises delay tolerance of the application data;
   receiving, from the one or more application servers at the delivery control server, an application data transmission for at least one of the identified applications used by the mobile device;
   storing the received application data in a buffer as a result of receiving the request by the delivery control server;

receiving an activity notification from the mobile device by the delivery control server indicating an opportunity to transmit the buffered data to the mobile device; and transmitting the buffered application data to the mobile device by the delivery control server in response to the activity notification.

2. A method of buffering application data operable at a mobile device, comprising:

transmitting information that identifies applications used by the mobile device to a delivery control server;

transmitting a notification to one or more application servers associated with the identified applications to push application data to the delivery control server instead of the mobile device;

determining that user activity is not detected at the mobile device;

in response to the determination that the user activity is not detected, transmitting a request to buffer application data for the identified applications to the delivery control server, wherein the request is adapted to request the delivery control server to buffer a portion of the application data in accordance with a selection criteria, and the selection criteria comprises delay tolerance of the application data;

detecting the user activity at the mobile device;

transmitting an activity notification to the delivery control server, upon detecting the user activity at the mobile device, to indicate an opportunity for the delivery control server to transmit buffered application data; and receiving buffered application data for at least one of the identified applications from the delivery control server in response to the activity notification.

3. The method of claim 2, wherein the detecting of the user activity comprises receiving an output signal from at least one sensor at the mobile device indicating the user activity.

4. The method of claim 3, wherein the at least one sensor comprises at least one of a motion sensor, an accelerometer, a touch sensor, a sound sensor, or a proximity sensor.

5. The method of claim 3, wherein the user activity comprises at least one of touching the mobile device, moving the mobile device, emitting an audible sound in the proximity of the mobile device, or approaching the mobile device.

6. The method of claim 2, wherein the detecting of the user activity comprises predicting imminent user activity.

7. The method of claim 6, wherein the predicting of the imminent user activity comprises detecting application activity at the mobile device indicating the imminent user activity.

8. A method of moderating buffered application data operable at an opportunity notification server, comprising:

receiving information that identifies applications used by a mobile device at the opportunity notification server;

transmitting configuration information to one or more application servers by the opportunity notification server to disable push operations for the identified applications at the one or more application servers;

transmitting a request to buffer application data at the one or more application servers for the identified applications to the one or more application servers by the opportunity notification server, wherein the request is adapted to request the one or more application servers to buffer a portion of the application data in accordance with a selection criteria, and the selection criteria comprises delay tolerance of the application data;

receiving an activity notification from the mobile device by the opportunity notification server indicating an opportunity to transmit buffered application data for at least one of the identified applications to the mobile device; and transmitting an opportunity notification to the one or more application servers by the opportunity notification server, responsive to the activity notification, to indicate an opportunity for the one or more application servers to transmit the buffered application data to the mobile device.

9. A method of moderating buffered application data operable at a mobile device, comprising:

transmitting information that identifies applications used by the mobile device to an opportunity notification server by the mobile device;

transmitting configuration information to at least one application server to disable push operations for the identified applications at the at least one application server by the mobile device;

transmitting a request to buffer application data for the identified applications to the at least one application server by the mobile device, wherein the request is adapted to request the at least one application server to buffer a portion of the application data in accordance with a selection criteria, and the selection criteria comprises delay tolerance of the application data;

detecting user activity at the mobile device by the mobile device;

transmitting an opportunity notification to the opportunity notification server by the mobile device, responsive to the detected activity, to indicate an opportunity for the at least one application server to transmit buffered application data for at least one of the identified applications to the mobile device; and receiving the transmitted application data from the at least one application server by the mobile device.

10. A delivery control server for buffering application data, comprising:

first means for receiving, configured to receive information that identifies applications used by a mobile device at the delivery control server, and further configured to receive a request to buffer application data for the identified applications, wherein the request is received from the mobile device, the request is adapted to request the delivery control server to buffer a portion of the application data in accordance with a selection criteria, and the selection criteria comprises delay tolerance of the application data;

means for transmitting a notification from the delivery control server to one or more application servers associated with the identified applications to push application data to the delivery control server instead of the mobile device;

second means for receiving, from the one or more application servers by the delivery control server, an application data transmission for at least one of the identified applications used by the mobile device;

means for storing the received application data in a buffer as a result of receiving the request by the delivery control server;

wherein the first means for receiving is further configured to receive an activity notification from the mobile device by the delivery control server indicating an opportunity to transmit the buffered data to the mobile device; and means for transmitting the buffered application data to the mobile device by the delivery control server in response to the activity notification.

11. A mobile device, comprising:
at least one processor;
a memory coupled to the at least one processor; and
the at least one processor configured to detect user activity and to determine that the user activity is not detected;
means for transmitting, configured to transmit information that identifies applications used by the mobile device to a delivery control server, and further configured to transmit a notification to one or more application servers associated with the identified applications to push application data to the delivery control server instead of the mobile device, and further configured to transmit a request to buffer application data for the identified applications to the delivery control server in response to the determination that the user activity is not detected, wherein the request to buffer the application data is adapted to request the delivery control server to buffer a portion of the application data in accordance with a selection criteria, the selection criteria comprising delay tolerance of the application data;
wherein the means for transmitting is further configured to transmit an activity notification to the delivery control server, upon detecting the user activity, to indicate an opportunity for the delivery control server to transmit buffered application data; and
means for receiving buffered application data for at least one of the identified applications from the delivery control server in response to the activity notification.

12. The mobile device of claim 11, wherein the at least one processor is further configured to detect at least one of touching the mobile device, moving the mobile device, emitting an audible sound in the proximity of the mobile device, or approaching the mobile device.

13. The mobile device of claim 11, wherein the at least one processor is further configured to predict imminent user activity.

14. The mobile device of claim 13, wherein the predicting of the imminent user activity comprises detecting application activity at the mobile device indicating the imminent user activity.

15. An opportunity notification server for moderating buffered application data, comprising:
means for receiving, configured to receive information that identifies applications used by a mobile device at the opportunity notification server from the mobile device; and
means for transmitting, configured to transmit configuration information to one or more application servers from the opportunity notification server to disable push operations for the identified applications at the one or more application servers, and further configured to transmit a request to buffer application data at the one or more application servers for the identified applications to the one or more application servers by the opportunity notification server, wherein the request is adapted to request the one or more application servers to buffer a portion of the application data in accordance with a selection criteria, and the selection criteria comprises delay tolerance of the application data;
wherein the means for receiving is further configured to receive an activity notification from the mobile device by the opportunity notification server indicating an opportunity to transmit buffered application data for at least one of the identified applications to the mobile device; and
wherein the means for transmitting is further configured to transmit an opportunity notification to the one or more application servers by the opportunity notification server, responsive to the activity notification, to indicate an opportunity for the one or more application servers to transmit the buffered application data to the mobile device.

16. A mobile device for moderating buffered application data, comprising:
a processor configured to detect user activity;
means for transmitting, configured to transmit information that identifies applications used by the mobile device to an opportunity notification server by the mobile device, wherein the means for transmitting is further configured to transmit configuration information to at least one application server by the mobile device to disable push operations for the identified applications at the at least one application server, and wherein the means for transmitting is further configured to transmit a request to buffer application data for the identified applications to the at least one application server by the mobile device, the request adapted to request the at least one application server to buffer a portion of the application data in accordance with a selection criteria, and the selection criteria comprises delay tolerance of the application data;
wherein the means for transmitting is further configured to transmit an opportunity notification to the opportunity notification server by the mobile device, responsive to the detected activity, to indicate an opportunity for the at least one application server to transmit buffered application data for at least one of the identified applications to the mobile device; and
means for receiving the transmitted application data from the at least one application server by the mobile device.

17. A delivery control server for buffering application data, comprising:
at least one processor;
a memory coupled to the at least one processor; and
a communication interface coupled to the at least one processor,
wherein the at least one processor is configured to:
receive information that identifies applications used by a mobile device at the delivery control server from the mobile device;
transmit, by the delivery control server, a notification to one or more application servers associated with the identified applications to push application data to the delivery control server instead of the mobile device;
receive a request to buffer application data for the identified applications at the delivery control server, wherein the request is received from the mobile device, the request is adapted to request the delivery control server to buffer a portion of the application data in accordance with a selection criteria, and the selection criteria comprises delay tolerance of the application data;
receive, from the one or more application servers at the delivery control server, an application data transmission for at least one of the identified applications used by the mobile device;
store the received application data in the memory as a result of receiving the request by the delivery control server;
receive an activity notification from the mobile device by the delivery control server indicating an opportunity to transmit the stored data to the mobile device; and transmit the stored application data to the mobile device by the delivery control server in response to the activity notification.

18. A mobile device, comprising:
   at least one processor;
   a memory coupled to the at least one processor; and
   a communication interface coupled to the at least one processor,
   wherein the at least one processor is configured to:
      transmit information that identifies applications used by the mobile device to a delivery control server;
      determine that user activity is not detected at the mobile device;
      in response to the determination that the user activity is not detected, transmit a notification to one or more application servers associated with the identified applications to push application data to the delivery control server instead of the mobile device;
      transmit a request to buffer application data for the identified applications to the delivery control server, wherein the request is adapted to request the delivery control server to buffer a portion of the application data in accordance with a selection criteria, and the selection criteria comprises delay tolerance of the application data;
      detect the user activity;
      transmit an activity notification to the delivery control server, upon detecting the user activity, to indicate an opportunity for the delivery control server to transmit buffered application data; and
      receive buffered application data for at least one of the identified applications from the delivery control server in response to the activity notification.

19. The mobile device of claim 18, further comprising at least one sensor coupled to the at least one processor,
   wherein the at least one processor, being configured to detect the user activity, is further configured to receive an output signal from the at least one sensor indicating the user activity.

20. The mobile device of claim 19, wherein the at least one sensor comprises at least one of a motion sensor, an accelerometer, a touch sensor, a sound sensor, or a proximity sensor.

21. The mobile device of claim 19, wherein the user activity comprises at least one of touching the mobile device, moving the mobile device, emitting an audible sound in the proximity of the mobile device, or approaching the mobile device.

22. The mobile device of claim 18, wherein the at least one processor, being configured to detect the user activity, is further configured to predict imminent user activity.

23. The mobile device of claim 22, wherein the at least one processor, being configured to predict the imminent user activity, is further configured to detect application activity at the mobile device indicating the imminent user activity.

24. An opportunity notification server for moderating buffered application data, comprising:
   at least one processor;
   a memory coupled to the at least one processor; and
   a communication interface coupled to the at least one processor,
   wherein the at least one processor is configured to:
      receive information that identifies applications used by a mobile device at the opportunity notification server from the mobile device;
      transmit configuration information to one or more application servers from the opportunity notification server to disable push operations for the identified applications at the one or more application servers;
      transmit a request to buffer application data for the identified applications at the one or more application servers to the one or more application servers by the opportunity notification server, wherein the request to buffer the application data is adapted to request the one or more application servers to buffer a portion of the application data in accordance with a selection criteria, the selection criteria comprising delay tolerance of the application data;
      receive an activity notification from the mobile device by the opportunity notification server indicating an opportunity to transmit buffered application data for at least one of the identified applications to the mobile device; and
      transmit an opportunity notification to the one or more application servers by the opportunity notification server, responsive to the activity notification, to indicate an opportunity for the one or more application servers to transmit the buffered application data to the mobile device.

25. A mobile device for moderating buffered application data, comprising:
   at least one processor;
   a memory coupled to the at least one processor; and
   a communication interface coupled to the at least one processor,
   wherein the at least one processor is configured to:
      transmit information that identifies applications used by the mobile device to an opportunity notification server by the mobile device;
      transmit configuration information to at least one application server to disable push operations for the identified applications at the at least one application server by the mobile device;
      transmit a request to buffer application data for the identified applications to the at least one application server by the mobile device, wherein the request to buffer the application data is adapted to request the at least one application server to buffer a portion of the application data in accordance with a selection criteria, the selection criteria comprising delay tolerance of the application data;
      detect user activity by the mobile device;
      transmit an opportunity notification to the opportunity notification server by the mobile device, responsive to the detected activity, to indicate an opportunity for the at least one application server to transmit buffered application data for at least one of the identified applications to the mobile device; and
      receive the transmitted application data from the at least one application server by the mobile device.

26. A non-transitory computer-readable storage medium operable at a delivery control server, comprising:
   instructions for causing the delivery control server to receive information that identifies applications used by a mobile device;
   instructions for causing the delivery control server to transmit a notification to one or more application servers associated with the identified applications to push application data to the delivery control server instead of the mobile device;
   instructions for causing the delivery control server to receive a request to buffer application data for the identified applications, wherein the request is received from the mobile device, the request is adapted to request the delivery control server to buffer a portion of the application data in accordance with a selection criteria, and the selection criteria comprises delay tolerance of the application data;

instructions for causing the delivery control server to receive, from the one or more application servers, an application data transmission for at least one of the identified applications used by the mobile device;

instructions for causing the delivery control server to store the received application data in a buffer as a result of receiving the request;

instructions for causing the delivery control server to receive an activity notification from the mobile device indicating an opportunity to transmit the buffered data to the mobile device; and instructions for causing the delivery control server to transmit the buffered application data to the mobile device in response to the activity notification.

27. A non-transitory computer-readable storage medium operable at a mobile device, comprising:

instructions for causing the mobile device to transmit information that identifies applications used by the mobile device to a delivery control server;

instructions for causing the mobile device to transmit a notification to one or more application servers associated with the identified applications to push application data to the delivery control server instead of the mobile device;

instructions for causing the mobile device to determine that user activity is not detected at the mobile device;

instructions for causing, in response to the determination that the user activity is not detected, the mobile device to transmit a request to buffer application data for the identified applications to the delivery control server, wherein the request to buffer the application data is adapted to request the delivery control server to buffer a portion of the application data in accordance with a selection criteria, the selection criteria comprising delay tolerance of the application data;

instructions for causing the mobile device to detect the user activity at the mobile device;

instructions for causing the mobile device to transmit an activity notification to the delivery control server, upon detecting the user activity at the mobile device, to indicate an opportunity for the delivery control server to transmit buffered application data; and instructions for causing the mobile device to receive buffered application data for at least one of the identified applications from the delivery control server in response to the activity notification.

28. The computer-readable storage medium of claim 27, wherein the instructions for causing the mobile device to detect the user activity are further configured to cause a computer to receive an output signal from at least one sensor at the mobile device indicating the user activity.

29. The computer-readable storage medium of claim 28, wherein the at least one sensor comprises at least one of a motion sensor, an accelerometer, a touch sensor, a sound sensor, or a proximity sensor.

30. The computer-readable storage medium of claim 28, wherein the user activity comprises at least one of touching the mobile device, moving the mobile device, emitting an audible sound in the proximity of the mobile device, or approaching the mobile device.

31. The computer-readable storage medium of claim 27, wherein the instructions for causing the mobile device to detect the user activity are further configured to cause the mobile device to predict imminent user activity.

32. The computer-readable storage medium of claim 31, wherein the instructions for causing the mobile device to predict the imminent user activity are further configured to cause the mobile device to detect application activity at the mobile device indicating the imminent user activity.

33. A non-transitory computer-readable storage medium operable at an opportunity notification server, comprising:

instructions for causing the opportunity notification server to receive information that identifies applications used by a mobile device;

instructions for causing the opportunity notification server to transmit configuration information to one or more application servers to disable push operations for the identified applications at the one or more application servers;

instructions for causing the opportunity notification server to transmit a request to buffer application data at the one or more application servers for the identified applications to the one or more application servers, wherein the request to buffer the application data is adapted to request the one or more application servers to buffer a portion of the application data in accordance with a selection criteria, the selection criteria comprising delay tolerance of the application data;

instructions for causing the opportunity notification server to receive an activity notification from the mobile device indicating an opportunity to transmit buffered application data for at least one of the identified applications to the mobile device; and instructions for causing the opportunity notification server to transmit an opportunity notification to the one or more application servers, responsive to the activity notification, to indicate an opportunity for the one or more application servers to transmit the buffered application data to the mobile device.

34. A non-transitory computer-readable storage medium operable at a mobile device, comprising:

instructions for causing the mobile device to transmit information that identifies applications used by the mobile device to an opportunity notification server;

instructions for causing the mobile device to transmit configuration information to at least one application server to disable push operations for the identified applications at the at least one application server;

instructions for causing the mobile device to transmit a request to buffer application data for the identified applications to the at least one application server, wherein the request to buffer the application data is adapted to request the at least one application server to buffer a portion of the application data in accordance with a selection criteria, the selection criteria comprising delay tolerance of the application data;

instructions for causing the mobile device to detect user activity at the mobile device;

instructions for causing the mobile device to transmit an opportunity notification to the opportunity notification server, responsive to the detected activity, to indicate an opportunity for the at least one application server to transmit buffered application data for at least one of the identified applications to the mobile device; and instructions for causing the mobile device to receive the transmitted application data from the at least one application server.

* * * * *